Feb. 9, 1926.
J. J. RARICK
1,572,560
MACHINE FOR RECHARGING MAGNETOS AND BATTERIES
Filed July 3, 1922
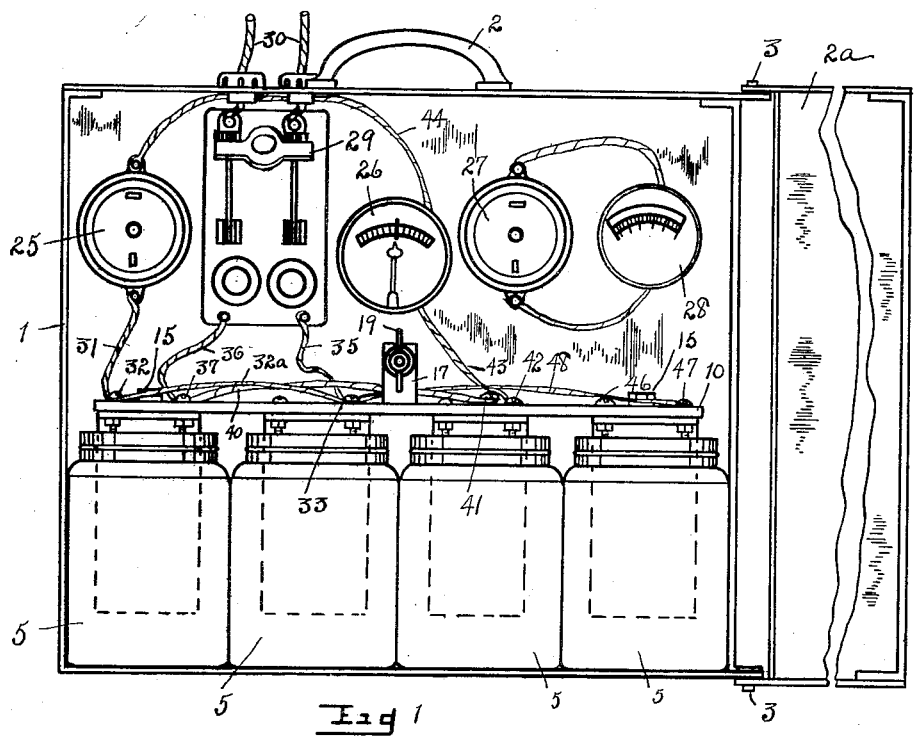
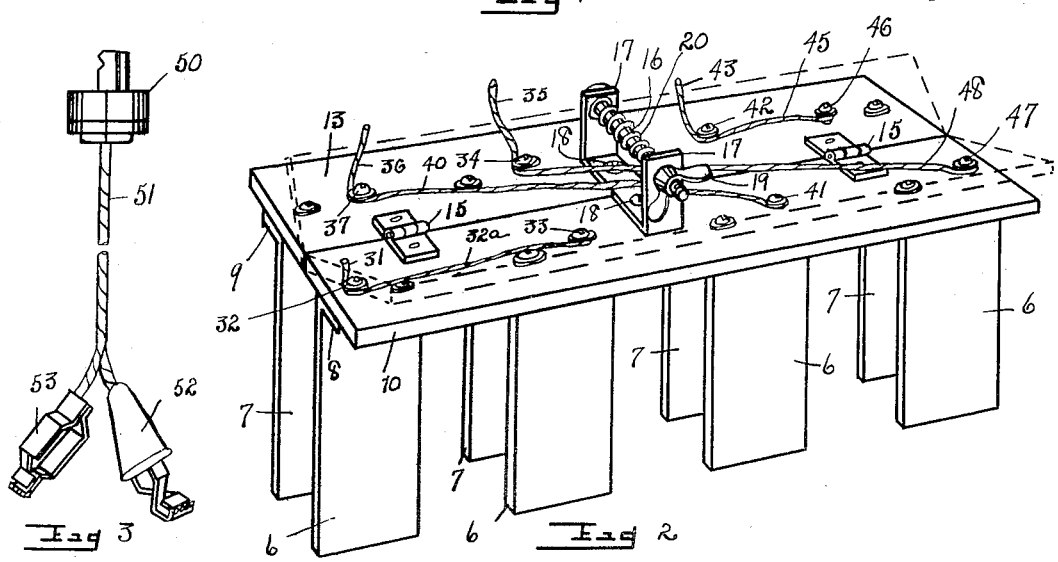
INVENTOR.
John J. Rarick
BY Thomas L. Wilder
ATTORNEY.

Patented Feb. 9, 1926.

1,572,560

UNITED STATES PATENT OFFICE.

JOHN J. RARICK, OF UTICA, NEW YORK.

MACHINE FOR RECHARGING MAGNETOS AND BATTERIES.

Application filed July 3, 1922. Serial No. 572,360.

*To all whom it may concern:*

Be it known that I, JOHN J. RARICK, a citizen of the United States, residing at Utica, in the county of Oneida and State of New York, have invented certain new and useful Improvement in Machines for Recharging Magnetos and Batteries, of which the following is a specification, reference being had therein to the accompanying drawing.

My invention relates to a device for recharging magnetos and batteries, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a device that will be useful in recharging the magneto or the battery especially of an automobile in a quick and simple manner with very little expense and without removing the said magneto or battery from the automobile or disturbing any other parts of said automobile.

Furthermore, the device is compact and contained in a portable casing, whereby it can be easily transported from place to place where it is required.

The object will be understood by referring to the drawings, in which:

Fig. 1 is an elevational view of the device, showing the door thereof opened and partially broken away;

Fig. 2 is an enlarged view, showing a perspective of certain parts of the device;

Fig. 3 is a detail view, somewhat reduced in scale and showing a plug, connecting devices, and wire which is broken away.

Referring more particularly to the drawings, the device embodies a casing 1 having a handle 2 by which it may be carried from place to place. A door 2ª is hinged at 3, 3 and is adapted to swing outwardly, whereby to give access to the interior of casing 1. Four glass jars 5 forming electric cells are disposed within casing 1 and are adapted to contain an electrolyte of sodium sulphate, sodium phosphate and distilled water.

Two electrodes 6 and 7 are disposed in pairs in each of the jars 5. Electrodes 6 are made preferably of lead and formed with right angled extensions 8, whereby they are each fastened to the member 10, made of any insulating material such as transite asbestos, by screw bolts hereinafter mentioned. Electrodes 7 are made preferably of aluminum and are formed likewise with right angled extensions 9, whereby they are each fastened to member 13 by headed screw bolts hereinafter mentioned.

Members 10 and 13 are united by hinges 15, 15, whereby they are able to swing from the full to dotted line positions relative to each other, as illustrated in Fig. 2. This hinging of members 10 and 13 will allow for the adjustment of the lower ends of each pair of electrodes 6 and 7, whereby to increase or decrease the resistance in the electric circuit. The nearer the lower ends of electrodes 6 and 7 are, the less the resistance and the farther apart they are, the greater the resistance.

Moreover, members 10 and 13 are swung upon their hinges 15 relative to each other by means of a headed bolt 16 supported in bearings in brackets 17, 17 that are fastened by screws 18 to members 10 and 13 respectively. A butterfly or winged nut 19 is screw threaded to the free end of bolt 16 and adapted to abut against the outer surface of one of the brackets 17, whereby the turning of nut 18 in one direction will draw the upper ends of brackets 17, 17 towards each other and, therefore, swing said members 10 and 13 relative to each other, more or less into the dotted line position illustrated in Fig. 2. This movement of members 10 and 13 will move the lower ends of each pair of electrodes 6 and 7 away from each other, whereby to increase the resistance in the electric circuit. A coiled spring 20, however, is disposed about bolt 16 and presses outwardly at each end thereof against the inner surfaces of brackets 17, 17, whereby to push the upper ends of brackets 17 away from each other to, thereby, hold normally the members 10 and 13 in the same horizontal plane, as illustrated in full lines in Fig. 2.

A polarized plug socket 25 is fastened to the wall of casing 1 and is in electrical connection with an ammeter 26 also fastened to the wall of said casing 1. The ammeter is employed in the circuit in order to appraise the operator of the device of the current in the charging electric circuit, as this is essential to the results obtained. A polarized plug socket 27 is fastened also to the wall of casing 1 and is in electrical circuit with a volt meter 28. Volt meter 28 is secured to the wall of casing 1 and is useful in ascertaining the number of volts in the circuit or battery. A knife switch 29 is fastened to the wall of casing 1 and is connected by wires 30, 30 to any well known source of alternating electric current.

The operation of the invention is as follows: The cells or jars 5 are filled with any suitable solution adapted to form an electrolyte, such as sodium sulphate, sodium phosphate and distilled water in proper proportions. The device is connected by wires 30, 30 to any well known source of electric alternating current. Plug 50, which is attached to a double strand of wire of suitable length and wound together for the sake of convenience, is inserted then into socket 25. The opposite ends of the double strand of wire 51 being separated, one end thereof having attached a snap fastener 52 is placed into engagement with the magneto of the automobile or battery, if that needs recharging, and the other end of the wire having attached another snap fastener 53 is secured to the ground, whereby to complete an electric circuit.

The knife switch 29 is closed then for five seconds and opened for five more seconds. This action is repeated five times, whereupon the magneto is turned half way round and the process again repeated until said magneto is completely recharged. The time necessary for recharging a magneto is usually about fifty seconds.

The voltage of the magneto can be determined after recharging by inserting plug 50 into socket 27 that is in circuit with volt meter 28.

The operator will turn winged nut 19 in order to adjust the position of the lower ends of electrodes 6 and 7, whereby to secure the correct resistance for the desired result.

Having thus described my invention what I claim as new and desire to secure by Letters Patent is:

1. In a device for recharging magnetos and batteries, a plurality of jars, electrodes disposed within said jars, members for supporting said electrodes, and spring means for holding said members in given position, to control the distance between the ends of said electrodes, whereby to govern the resistance in the circuit.

2. In a device for recharging magnetos and batteries, a plurality of jars, electrodes disposed within said jars, members for supporting said electrodes, brackets mounted on said members, a bolt carried by said brackets, and a spring mounted on said bolt to hold said electrodes in given relation to each other, whereby to govern the resistance in said circuit.

3. In a device for recharging magnetos and batteries, a plurality of jars, electrodes disposed within said jars, members for supporting said electrodes, brackets mounted on said members, a bolt carried by said brackets, a spring mounted on said bolt to hold said electrodes in given relation to each other, whereby to govern the resistance in said circuit and a movable member on said bolt for controlling the position of the members for supporting said electrodes.

In testimony whereof I have affixed my signature.

JOHN J. RARICK.